United States Patent
Chu

(10) Patent No.: US 9,073,598 B2
(45) Date of Patent: Jul. 7, 2015

(54) FOLDABLE BICYCLE CRANK

(71) Applicant: Shao-Hua Chu, Taipei (TW)

(72) Inventor: Shao-Hua Chu, Taipei (TW)

(*) Notice: Subject to any disclaimer, the term of this patent is extended or adjusted under 35 U.S.C. 154(b) by 0 days.

(21) Appl. No.: 14/449,154

(22) Filed: Aug. 1, 2014

(65) Prior Publication Data
US 2015/0033908 A1     Feb. 5, 2015

(30) Foreign Application Priority Data

Aug. 1, 2013   (TW) .............................. 102146003 A

(51) Int. Cl.
*B62M 3/00* (2006.01)
(52) U.S. Cl.
CPC ...................................... *B62M 3/00* (2013.01)
(58) Field of Classification Search
CPC ............. B62M 3/00; B62M 3/02; B62M 3/08
USPC ......... 74/594.4, 594.7; 280/278, 291; 296/75; 482/80, 146, 147
See application file for complete search history.

(56) References Cited

U.S. PATENT DOCUMENTS

| | | | | |
|---|---|---|---|---|
| 1,091,405 | A | * | 3/1914 | Trambley ...................... 74/594.7 |
| 6,129,370 | A | * | 10/2000 | Hsieh et al. .................... 280/291 |
| 6,637,292 | B2 | | 10/2003 | Chu |
| 8,893,581 | B2 | * | 11/2014 | White .......................... 74/594.7 |

FOREIGN PATENT DOCUMENTS

| | | | | | |
|---|---|---|---|---|---|
| FR | 2726803 | A1 | * | 5/1996 | ............... B62M 3/08 |
| JP | 02127184 | A | * | 5/1990 | ............... B62M 3/08 |

* cited by examiner

*Primary Examiner* — Thomas R. Hannon
*Assistant Examiner* — Adam D Rogers
(74) *Attorney, Agent, or Firm* — Jianq Chyun IP Office

(57) ABSTRACT

A foldable bicycle crank includes a crank having outer and inner ends, a central shaft passing through two axial holes of the inner end and an axial hole of the outer end, a crank head rotatable around the central shaft by a limited angle, and a slider. A piercing hole is on one side of a flank mortise between the two vertical axial holes. A tenon is formed on a recess at the inner end. A pedal hole and a vertical axial hole are on the crank head, and a tenon is on a recess on the crank head. At least one mortise and a protrusion are formed on the slider. An elastic member is placed into a room on a top portion of the protrusion which can be positioned into or can pass through the piercing hole. A press button in the room pushes against the elastic member.

6 Claims, 6 Drawing Sheets

FOLDABLE BICYCLE CRANK

CROSS-REFERENCE TO RELATED APPLICATION

This application claims the priority benefit of Taiwan application serial no. 102146003, filed on Aug. 1, 2013. The entirety of the above-mentioned patent application is hereby incorporated by reference herein and made a part of this specification.

BACKGROUND

1. Field of the Invention

The invention relates to a foldable bicycle crank; more particularly, the invention relates to a foldable bicycle crank in which a crank head can be quickly and conveniently bent and rotated by an angle, so as to effectively secure the crank no matter whether the crank head is unfolded or folded.

2. Description of Related Art

The transverse area occupied by a normal bicycle is significantly expanded by the vertically arranged crank and pedals protruding from the body of the bicycle. When the bicycle with the pedals is not ridden but moved, the protruding pedals are very much likely to get stuck with other objects and may cause inconvenience to storage and package of the bicycle during transportation. Currently, folding mechanisms are often arranged on the pedals to resolve said issues. With said mechanisms, the foldable pedals are bent by 90 degrees in an upward direction or in a downward direction, and the upright pedals lean against the outer side of the crank; thereby, the transverse width of the bicycle is increased, and the purpose of minimizing the volume of the folded bicycle crank cannot be achieved. In addition, the folding mechanisms are not reliable and may easily be loosened, which frequently discomfort the user.

A conventional foldable bicycle crank, as disclosed in U.S. Pat. No. 6,637,292 invented by the inventor of the invention described herein, is a foldable and rotatable crank that can be pivoted and rotated by 90 degrees and located at the inner side of the crank, so as not to increase the transverse width of the bicycle. However, the folding operation requires both hand of the user, and the structural design of the conventional foldable bicycle crank is complicated and costly. Hence, further improvement may be needed. Besides, other crank structures that can be applied to fold the pedals of a bicycle often require assistant tools, significant operational time, and/or complicated set-up processes, and thus improvement of the existing crank structures is expected as well.

SUMMARY OF THE INVENTION

The invention is directed to a foldable bicycle crank, wherein the rotating and positioning operations of the crank and a crank head are simple and fast and can be done with one single hand.

The invention is further directed to a foldable bicycle crank with a pedal that is securely positioned no matter whether the pedal is in an unfolded state for use or in a folded state for storage, and components are neither displaced nor loosened.

The invention is further directed to a foldable bicycle crank with a structure different from that of the conventional foldable bicycle crank.

The aforementioned and other structural features and effects of the invention will be fully apparent from a reading of the following description with reference to the accompanying drawings.

In an embodiment of the invention, a foldable bicycle crank provided herein includes: a crank having an outer end and an inner end, wherein an axial hole is formed on the outer end of the crank, a vertical upper axial hole and a vertical lower axial hole are formed on the inner end of the crank, a flank mortise is formed between the upper and lower axial holes, a piercing hole is formed on a side of the flank mortise, a recess is formed on a sidewall of the crank, and a tenon is formed on the recess; a crank head, wherein a pedal hole is formed on an outer side of the crank head, a vertical axial hole is formed on a body of the crank head, a recess is formed on a sidewall of the crank head, and a tenon is formed on the recess; a slider, wherein at least one mortise and a protrusion are formed on an inner wall of the slider, a downward room is formed on a top portion of the protrusion, an elastic member is placed into the room, a press button is located in the room and pushes against the elastic member, and the protrusion is positioned into or passes through the piercing hole; and a central shaft passing through the vertical upper axial hole of the inner end, the axial hole of the outer end, and the vertical lower axial hole of the inner end, the crank head rotating around the central shaft by a limited angle.

Several exemplary embodiments accompanied with figures are described in detail below to further describe the invention in details.

DETAILED DESCRIPTION OF DISCLOSED EMBODIMENTS

Figure 1:
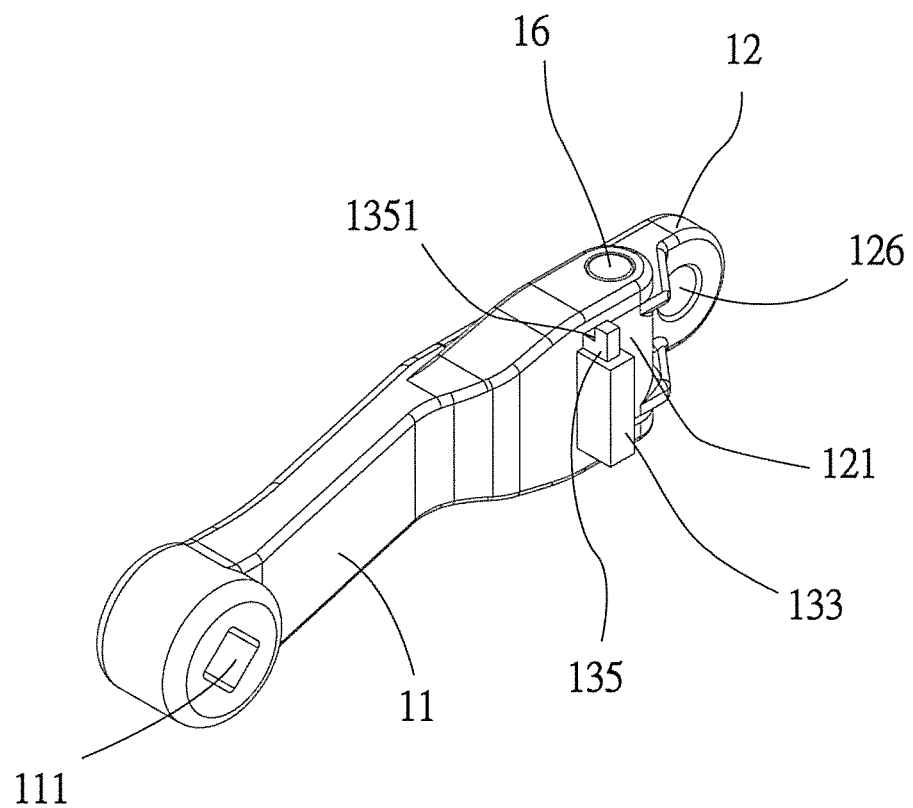
FIG. 1 is a three-dimensional diagram illustrating an assembly structure of a foldable bicycle crank according to an embodiment of the invention.

In an embodiment of the invention, as shown in FIG. 1, FIG. 2, FIG. 3, and FIG. 4, a foldable bicycle crank provided herein includes:

a crank 11 having an outer end and an inner end, wherein an axial hole 11 is formed on the outer end of the crank 11, a vertical upper axial hole 113 and a vertical lower axial hole 115 are formed on the inner end of the crank 11, a flank mortise 116 is formed between the upper and lower axial holes 113 and 115, a piercing hole 144 is formed on a side of the flank mortise 116, a recess 112 is formed on a sidewall of the crank 11, and a tenon 114 is formed on the recess 112;

a crank head 12, wherein a pedal hole 126 is formed on an outer side of the crank head 12, a vertical axial hole 123 is formed on a body of the crank head 12, a recess 122 is formed on a sidewall of the crank head 122, and a tenon 124 is formed on the recess 122;

a slider 13, wherein at least one mortise 132 and a protrusion 133 are formed on an inner wall 131 of the slider 13, a downward room 134 is formed on a top portion of the protrusion 133, an elastic member 136 is placed into the room 134, a press button 135 is located in the room 134 and pushes against the elastic member 136, and the protrusion 133 is positioned into or passes through the piercing hole 144; and a central shaft 16 passing through the vertical upper axial hole 113 of the inner end, the axial hole 123 of the outer end, and the vertical lower axial hole 115 of the inner end, the crank head 12 rotating around the central shaft 16 by a limited angle.

Figure 3:
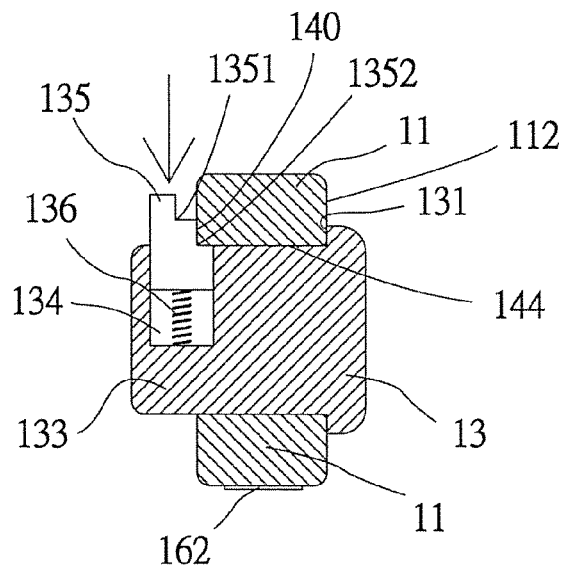
FIG. 3 is a schematic cross-sectional diagram illustrating a slider locked and fixed to a crank and a crank head according to an embodiment of the invention.
Figure 4:
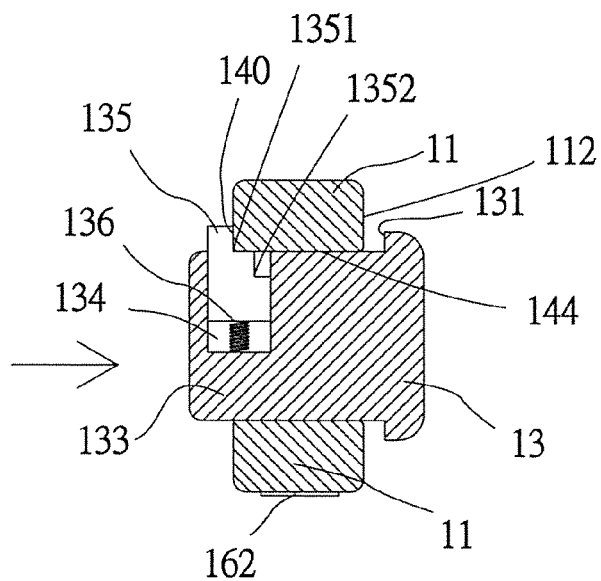
FIG. 4 is a schematic cross-sectional diagram illustrating a slider moving in a piercing hole of a crank according to an embodiment of the invention.

According to an embodiment of the invention, a first locking recess 1351 and a second locking recess 1352 are arranged on a side of the press button 135 and can be selectively locked and positioned onto a locking interface 140 above the piercing hole 144, as shown in FIG. 3 and FIG. 4.

Figure 2:
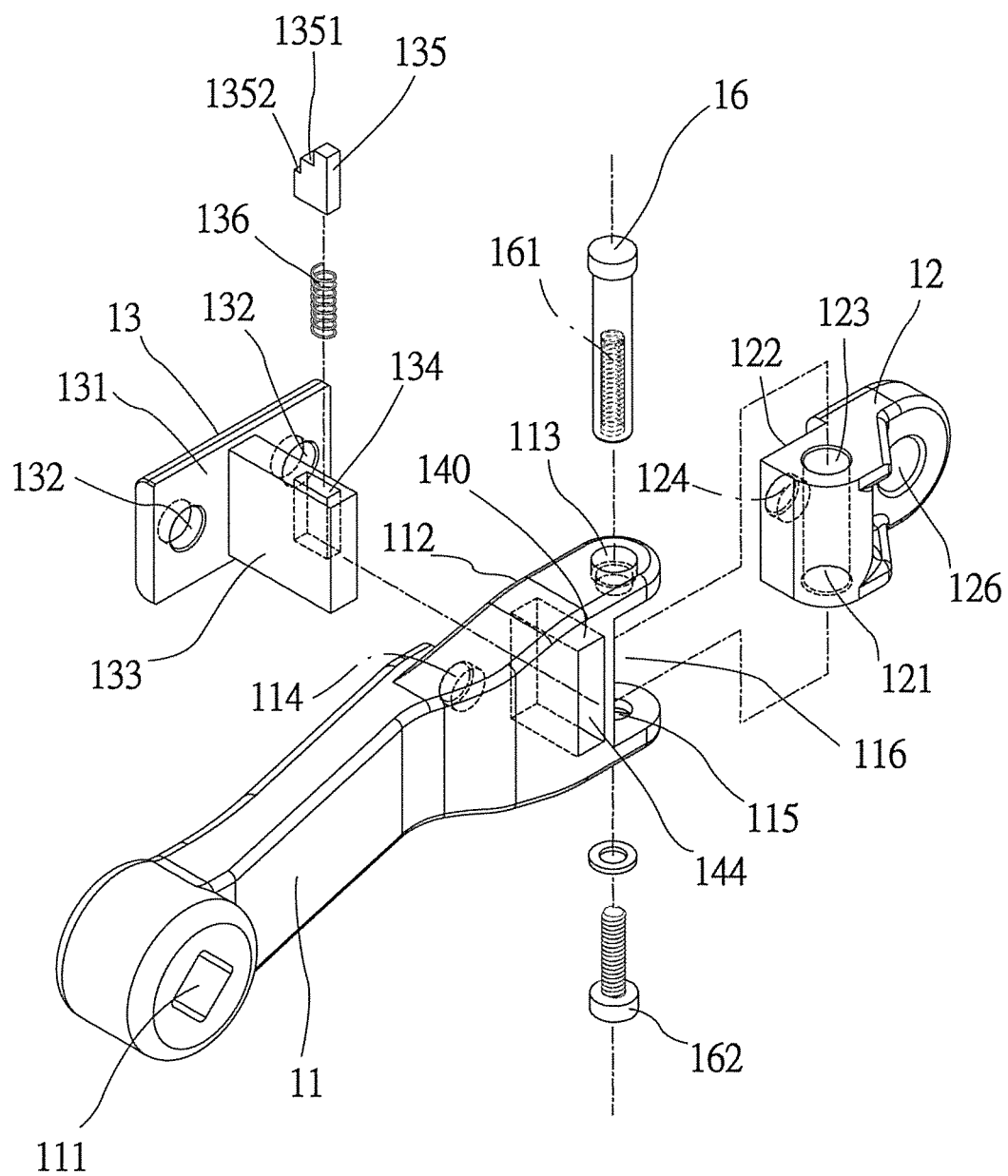
FIG. 2 is a three-dimensional explosive diagram illustrating components of a foldable bicycle crank according to an embodiment of the invention.

According to an embodiment of the invention, a side of the crank head 12 is an arc-shaped surface 121 movable in the flank mortise 116, as shown in FIG. 2.

According to an embodiment of the invention, as shown in FIG. 2, the central shaft 16 has an inner screw hole 161, and a screw bolt 162 is screwed into the inner screw hole 161 through the lower axial hole 115 from bottom to top.

Figure 5:
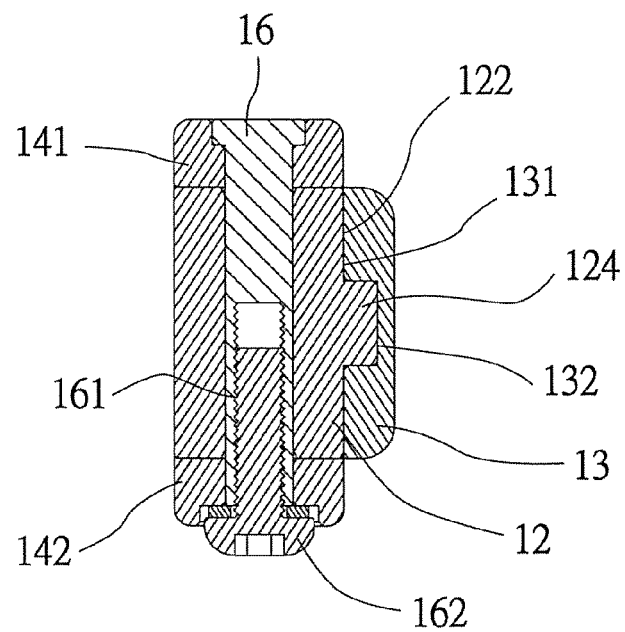
FIG. 5 is a schematic cross-sectional diagram illustrating a tenon of a crank head inserted into a mortise of a slider according to an embodiment of the invention.
Figure 6:
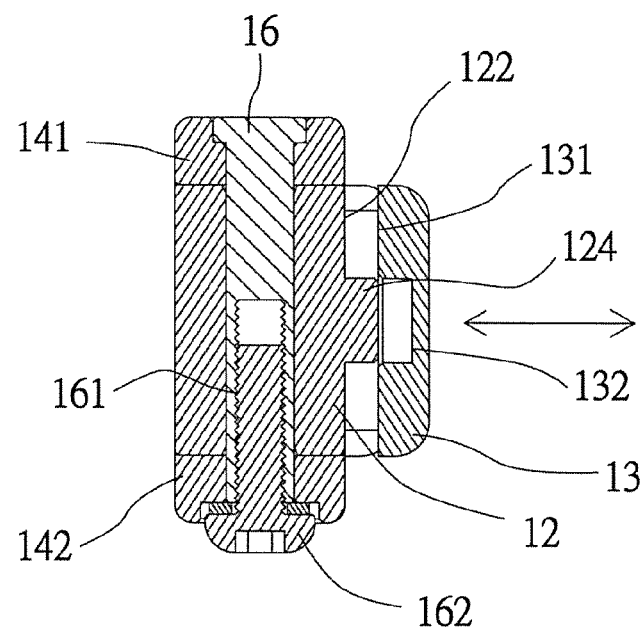
FIG. 6 is a schematic cross-sectional diagram illustrating a tenon of a crank head removed from a mortise of a slider according to an embodiment of the invention.

According to an embodiment of the invention, the tenons 114 and 124 can be timely inserted into or removed form the at least one mortise 132 of the slider 13, as shown in FIG. 5 and FIG. 6.

Figure 7:
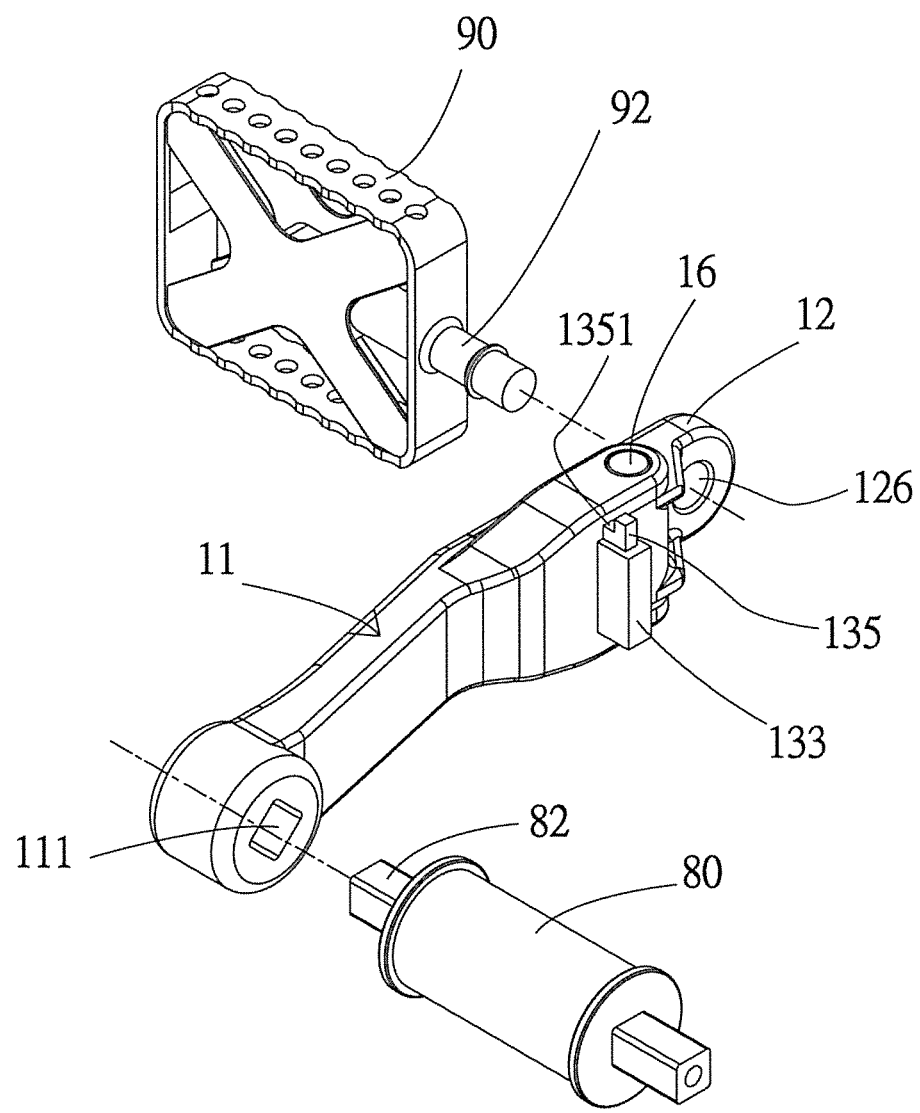
FIG. 7 is a schematic three-dimensional explosive diagram illustrating connection between a pedal and a transmission shaft of a bicycle according to an embodiment of the invention.

According to an embodiment of the invention, the axial hole 111 of the crank 11 and a connection portion 82 of a transmission shaft 80 of the bicycle are connected and fixed to each other, as shown in FIG. 7.

According to an embodiment of the invention, the pedal hole 126 and an axial portion 92 of a pedal 90 of the bicycle are connected and fixed to each other, as shown in FIG. 7.

Figure 8:
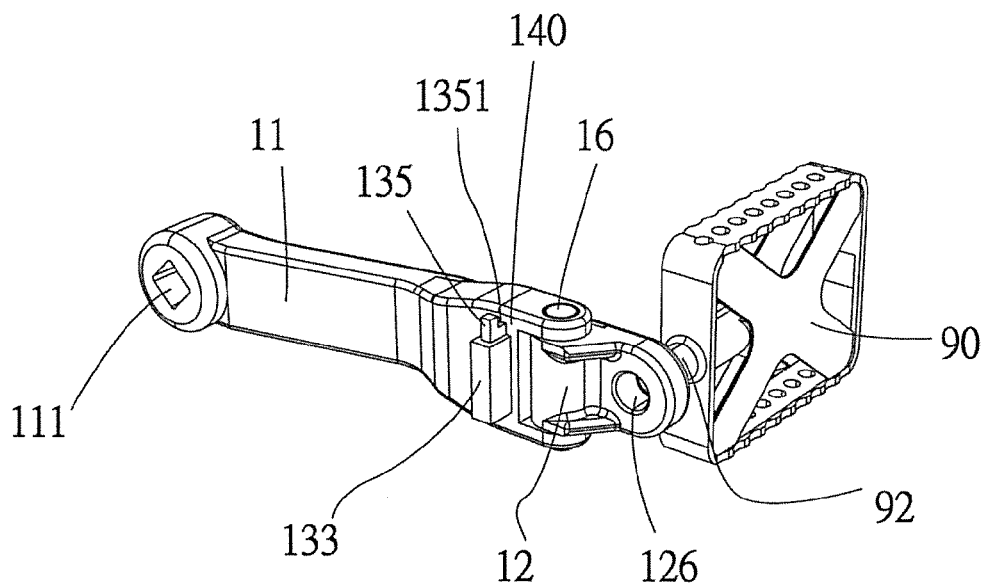
FIG. 8 is a three-dimensional diagram illustrating that a crank head and a pedal are assembled at 90 degrees according to an embodiment of the invention.
Figure 9:
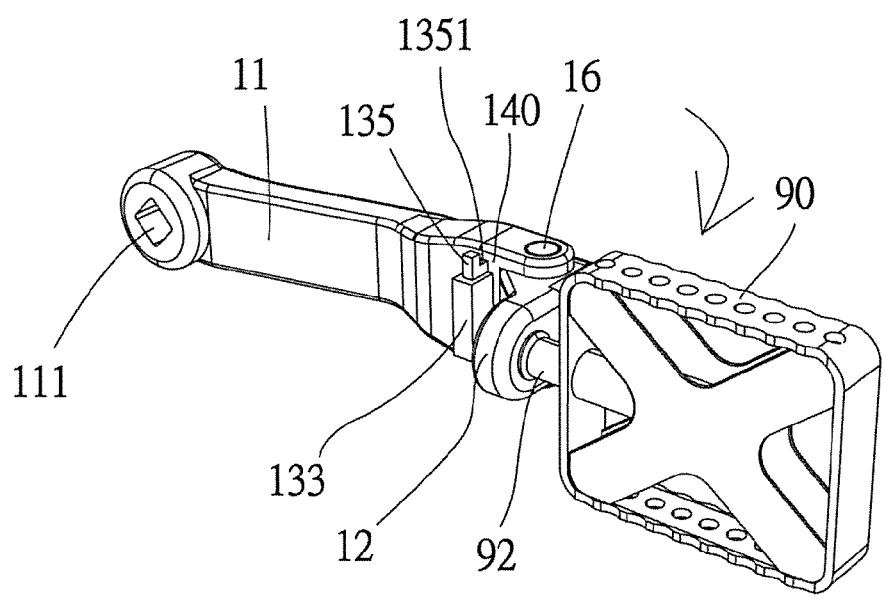
FIG. 9 is a three-dimensional diagram illustrating that a pedal is vertically folded according to an embodiment of the invention.

As shown in FIG. 1 and FIG. 2, the central shaft 16 passes through the upper axial hole 113, the axial hole 123, and the lower axial hole 115, and the screw bolt 162 is screwed into the inner screw hole 161 through the lower axial hole 115. The arc-shaped surface 121 allows the crank head 12 to rotate around the central shaft 16 in the flank mortise 116 by a limited angle. The crank head 12 is driven by a user's hand and can thus rotate around the central shaft 16 by a limited angle; in the meantime, the crank head 12 can drive the pedal 90 to be vertically extended, as shown in FIG. 9. Here, the pedal 90 is in a folded state, such that the protruding volume of the pedal 90 can be reduced. By contrast, the crank head 12 can drive the pedal 90 to be rotated by 90 degrees in a reverse direction, as shown in FIG. 8; at this time, the pedal 90 is transversely extended, so that a user's foot can step onto the pedal 90. The crank 11 is simultaneously driven to rotate the transmission shaft 80, as shown in FIG. 7. The second locking recess 1352 of the press button 135 is not marked in FIG. 8 and FIG. 9 and is locked onto the locking interface 140; at this time, the crank 11 and the crank head 12 are fixed, and the pedal 90 is not displaced.

FIG. 3 and FIG. 4 are schematic cross-sectional diagrams illustrating a slider 13 locked and fixed to or removed from the recess 112 of the crank 11 and the recess 122 of the crank head 12 according to an embodiment of the invention. The protrusion 133 passes through the piercing hole 144, and there is a height difference between the first locking recess 1351 and the second locking recess 1352 of the press button 135. The tension of the elastic member 136 in the room 134 locks and positions the second locking recess 1352 to the locking interface 140 of an upper fastener 141, as shown in FIG. 3. The inner wall 131 leans against the recess 112 of the crank 11 and the recess 122 of the crank head 12, and the two tenons 114 and 124 are respectively inserted into the two mortises 132, as shown in FIG. 2 and FIG. 5. Here, even though the crank head 12 and the crank 11 are vertically extended, or there is a 90-degree angle between the crank head 12 and the crank 11, the crank head 12 and the crank 11 are engaged with each other in a secure manner as long as the second locking recess 1352 is locked and positioned to the locking interface 140 of the upper fastener 141, as shown in FIG. 3, and no components are loosened or disengaged.

As shown by the arrow in FIG. 3, a user may press down the press bottom 135 with his or her finger (e.g., an index finger); at this time, the elastic member 136 is in a compressed state in the room 134, and the press button 135 is moved in a downward direction in the room 134. A force is then exerted to the protrusion 133 with use of a finger (e.g., a thumb) in a direction shown by the arrow in FIG. 4, for instance, such that the first locking recess 1351 is locked and positioned to the locking interface 140 of the upper fastener 141. At this time, the inner surface 131 leaves the recesses 112 and 122, and the tenons 114 and 124 are removed from the mortises 132, as shown in FIG. 2 and FIG. 6. The slider 13 is no longer positioned to the crank head 12 and the crank 11; thereby, the crank head 12 subject to the force may rotate around the central shaft 16 in the flank mortise 116 by a limited angle, so as to determine whether the crank head 12 is vertically extended or in a 90-degree state with respect to the crank 11. After whether the pedal 90 is in a folded state (e.g., is vertically extended) or in a 90-degree state for use is determined, a reverse force is exerted to the slider 13 by the finger. The protrusion 133 moves forward in the piercing hole 144, and the press button 135 is simultaneously moved together with the slider 13. The first locking recess 1351 is moved and disengaged from the locking interface 140, the elastic member 136 is stretched in an upward manner in the room 134, and the second locking recess 1352 is again positioned to the locking interface 140, as shown in FIG. 3; thereby, the crank head 12 and the crank 11 are engaged in a secure manner, and no components are loosened or disengaged.

The mortise 132 can be replaced by a tenon, and the tenons 114 and 124 can be replaced by mortises; the male tenon and the female mortise are equivalent to those provided herein and fall within the scope of the invention. The crank 11 described herein may be formed by molding and forging and may then be processed and shaped. The crank head 12 pivoted to the crank 11 by one single central shaft 16 can rotate around the central shaft 16 by a limited angle in the flank mortise 116 of the crank 11, and the rotating and positioning operations of the crank head 12 are simple and fast and can be done with one single hand. In addition, no complicated components are required.

To sum up, in the foldable bicycle crank provided herein, the press button 135 and the slider 13 can be moved by a user with his or her one single hand, and thus the foldable bicycle crank can be operated in an efficient manner. Moreover, the pedal 90 is securely positioned no matter whether the pedal 90 is in an unfolded state for use or in a folded state for storage, and components are neither displaced nor loosened.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A foldable bicycle crank comprising:
    a crank having an outer end and an inner end, an axial hole being formed on the outer end, a vertical upper axial hole and a vertical lower axial hole being formed on the inner end, a flank mortise being formed between the upper and lower axial holes, a piercing hole being formed on a side of the flank mortise, a recess being formed on a sidewall of the inner end, a tenon being formed on the recess;
    a crank head, a pedal hole being formed on an outer side of the crank head, a vertical axial hole being formed on a body of the crank head, a recess being formed on a sidewall of the crank head, a tenon being formed on the recess;
    a slider, at least one mortise and a protrusion being formed on an inner wall of the slider, a downward room being formed on a top portion of the protrusion, an elastic member being placed into the room, a press button being located in the room and pushing against the elastic member, the protrusion being positioned into or passing through the piercing hole; and
    a central shaft passing through the vertical upper axial hole of the inner end, the axial hole of the outer end, and the vertical lower axial hole of the inner end, the crank head rotating around the central shaft by a limited angle.

2. The foldable bicycle crank according to claim 1, wherein at least one first locking recess and at least one second locking recess are arranged on a side of the press button, and one of the at least one first locking recess and the at least one second locking recess is locked and positioned onto a locking interface above the piercing hole.

3. The foldable bicycle crank according to claim 1, wherein a side of the crank head is an arc-shaped surface movable in the flank mortise.

4. The foldable bicycle crank according to claim 1, wherein the central shaft has an inner screw hole, and a screw bolt is screwed into the inner screw hole through the vertical lower axial hole from bottom to top.

5. The foldable bicycle crank according to claim 1, wherein the tenons are inserted into or removed form the at least one mortise of the slider.

6. The foldable bicycle crank according to claim 1, wherein the axial hole of the crank and a connection portion of a transmission shaft of a bicycle are connected and fixed to each other.

* * * * *